March 10, 1931. J. NADEO 1,796,212
CHEESE AND BUTTER CUTTER
Filed April 28, 1930 2 Sheets-Sheet 1
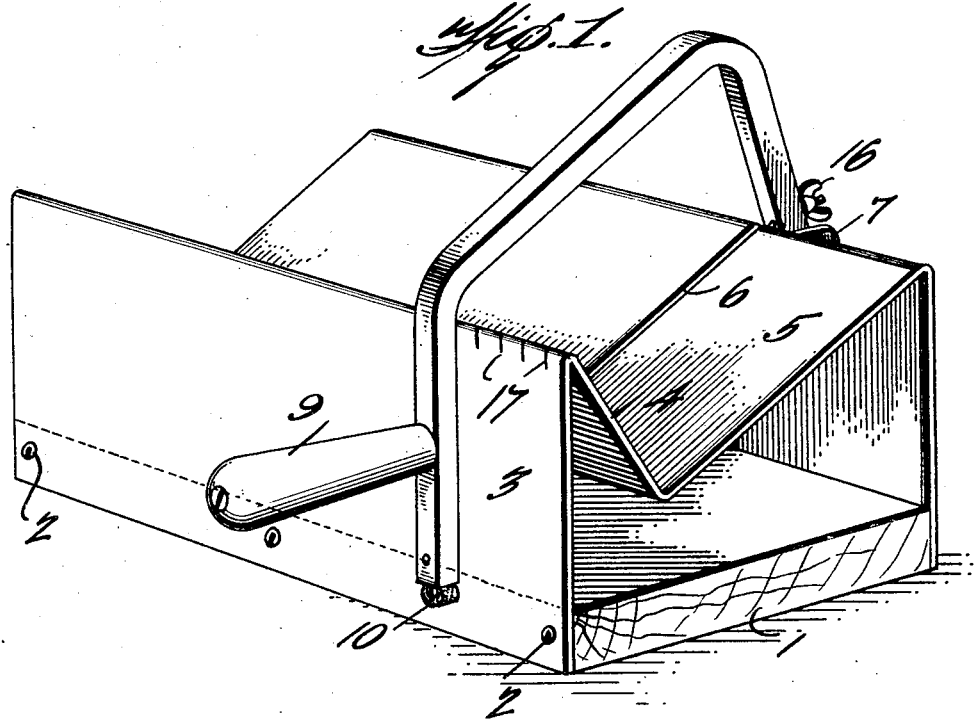
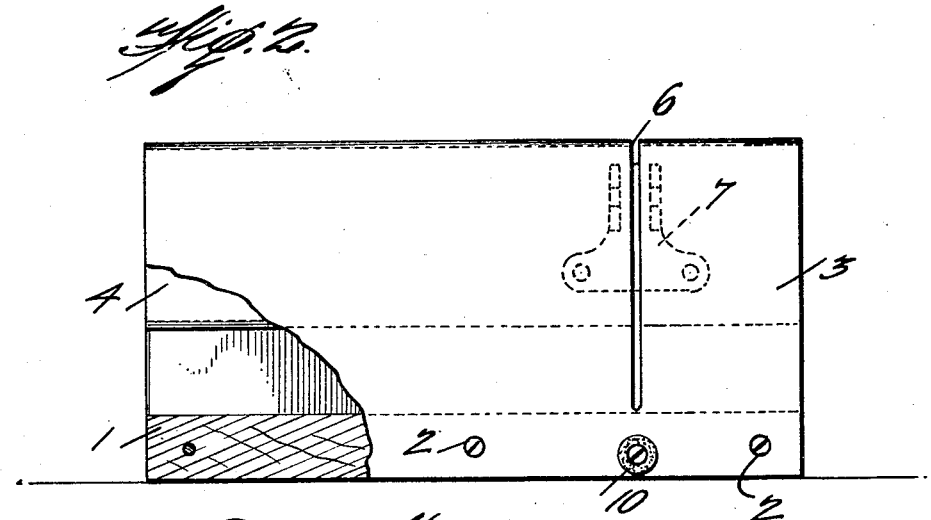
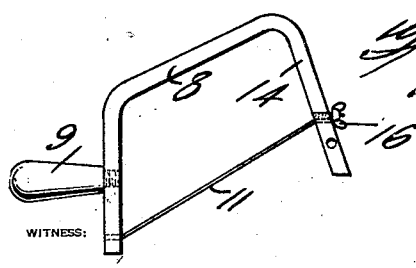
JAMES NADEO
INVENTOR
BY Victor J. Evans
ATTORNEY

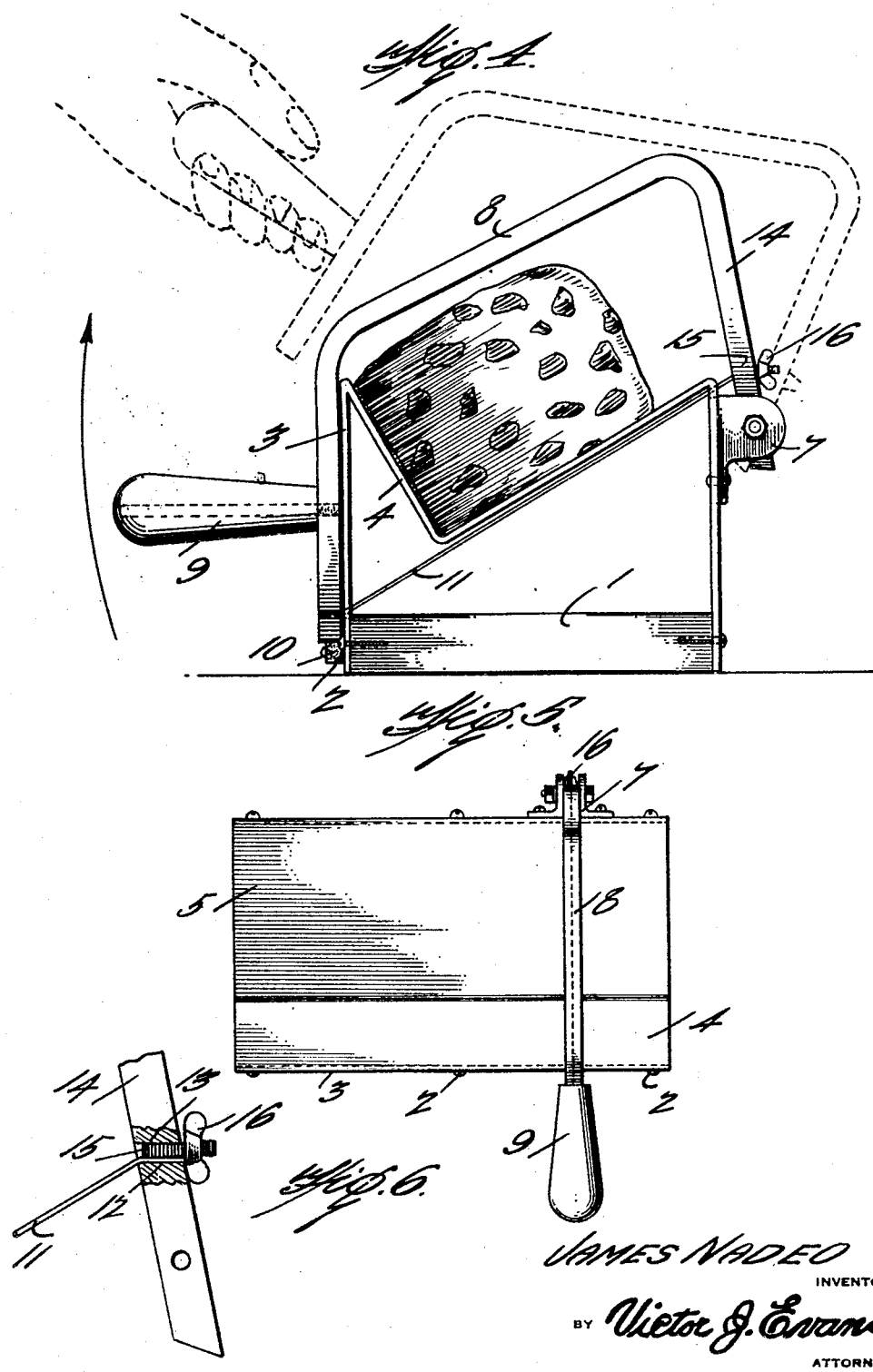

Patented Mar. 10, 1931

1,796,212

UNITED STATES PATENT OFFICE

JAMES NADEO, OF CLEVELAND, OHIO, ASSIGNOR OF TWENTY PER CENT TO MAURICE SPEYER, TEN PER CENT TO JEROME J. NEWMAN, AND FIVE PER CENT TO JOHN A. LYONS, ALL OF CLEVELAND, OHIO, AND FIVE PER CENT TO HUGO BRUNI, OF ALLIANCE, OHIO

CHEESE AND BUTTER CUTTER

Application filed April 28, 1930. Serial No. 448,100.

My present invention has reference to a cutter for butter or cheese arranged in what is termed a brick form and my primary object is the provision of an extremely simple, cheaply constructed but strong and durable device whose main or body portion is constructed from a single sheet of metal to include parallel sides and a top that has downwardly inclined portions that afford the same with a trough on which the material to be cut is arranged and over which the said material is slid, one of the sides having pivotally secured theron a yoke-like member or frame to whose side ends there is secured a wire cutter and the non-pivoted arm of the yoke having a handle whereby the wire is forced through the material and through a slot in the trough for cutting the material into slices of predetermined widths in an easy and expeditious manner.

A further object is the provision of a cutter for this purpose which shall be of a sanitary nature, that is, wherein all of the parts thereof may be readily and quickly cleaned should occasion require.

To the attainment of the above broadly stated objects and many others the improvement further consists in the invention hereinafter described and definitely claimed.

In the drawings:

Figure 1 is a perspective view of the improvement.

Figure 2 is a side elevation thereof with parts in section.

Figure 3 is a side elevation of the wire cutter and the frame therefor.

Figure 4 is an end view illustrating by dotted lines the operation of the device.

Figure 5 is a top plan view.

Figure 6 is a detail elevation with parts in section to illustrate the manner in which one end of the wire cutter is adjustably fixed on one of the side members of the supporting yoke or frame therefor.

In carrying out my invention I make use of a substantially rectangular base 1 which is preferably of wood and is of a desired width, length and thickness. To the opposite sides or edges of the base 1 I fix by screws or analogous means 2 the side members 3 of the improvement. The body is constructed from a single sheet of suitable non-corrosive material, and the top of the said body is formed with a trough for the reception of the material and on which the material is slid. The trough is formed by bending one of the sides at a downward acute angle 4 and bending the upper edge of the opposite side at a less determined angle 5. The wall 5 is of a greater length than the walls 4 of the trough. The angle walls 4 and 5 of the trough are formed with an alining opening 6 and this opening also enters the sides 3. Fixed on one of the sides to the opposite sides of the opening 6 there are angle plates or brackets 7, between which there is pivoted one of the arms of a substantially U-shaped frame or yoke 8. The second arm of the yoke is designed to be swung against the second side 3 of the body and this arm is provided with an outstanding handle 9. The end of the arm provided with the handle 9 is designed to contact with a compressible stop element 10. Fixedly secured on the said arm of the yoke or frame 8 there is one end of a wire cutter 11. The second end of the cutter passes through a lateral groove 12 which intersects a rounded and threaded opening 13 in the second arm of the yoke or frame. For distinction this arm is indicated by the numeral 14. There is threaded through the opening 13 a headless bolt 15 and the second or non-fixed end of the wire cutter 11 is received through the groove 12 and has its outer end bent against the outer face of the arm 14, so that this angle end of the cutter may be engaged by a wing nut 16 which is screwed on the portion of the bolt that projects beyond the outer side of the arm 14.

Obviously one of the walls of the frame 3 may be provided with graduated marks 17 and after the cutter is raised to the dotted line position in Figure 4 of the drawings the material is slid through the trough so that its outer end is brought in a line with any of the graduated marks 17. The marks are so arranged as to indicate the weight of the slice to be cut from the material. The frame or yoke is simply swung downwardly to bring the cutter wire 11 through the material and through the slot or opening 6, and by this simple arrangement it will be apparent that the material can be easily and quickly sliced and that the weight or thickness of the said slices can be accurately determined. The body and trough being constructed of non-corrosive metal may be readily cleaned and as the trough has its pointed end, that is, the portion thereof afforded by the juncture of the walls 4 and 5 disposed above the base 1 a free circulation of air will be directed through the improvement.

It is believed the foregoing description when read in connection with the accompanying drawings will clearly set forth the simplicity and advantages of the construction to those skilled in the art so that further detailed description will not be required. Obviously I do not wish to be restricted to the precise details herein set forth and, therefore, hold myself entitled to make such changes as fairly fall within the scope of what I claim.

Having described the invention, I claim:

A cutter for the purpose set forth, including a substantially rectangular base, a plate bent to comprise parallel sides which are fixed to the base, said sides having their upper edges bent at inward and downward inclinations to provide a trough, said trough and the sides having a transverse slot therethrough, ears upon one of the sides opposite the slot, a yoke-like frame having one of its arms pivoted between the ears and swingable over the trough and sides, the second arm of the yoke having a handle, a compressible stop for the last mentioned arm of the yoke, a wire cutter fixed to one of the arms of the yoke and passing through a groove in the second arm of the yoke, and designed to be bent against such arm, an adjustable element on the second arm of the yoke for compressing the bent end of the wire against said arm, said wire being movable, when the yoke is swung, through the opening in the trough and sides and one of the sides having graduated marks thereon in a line with the upper edge thereof.

In testimony whereof I affix my signature.

JAMES NADEO.